United States Patent
Lugert et al.

(10) Patent No.: US 8,703,231 B2
(45) Date of Patent: Apr. 22, 2014

(54) LEAD FOR PAINTING AND METHOD OF PAINTING WITH A LEAD

(75) Inventors: Gerhard Lugert, Nürnberg (DE); Reiner Appel, Oberasbach (DE); Harald von Godin, Oberasbach (DE); Joachim Kinzel, Stein (DE)

(73) Assignee: Faber-Castell AG, Stein (DE)

( * ) Notice: Subject to any disclaimer, the term of this patent is extended or adjusted under 35 U.S.C. 154(b) by 334 days.

(21) Appl. No.: 12/972,683

(22) Filed: Dec. 20, 2010

(65) Prior Publication Data

US 2011/0151108 A1 Jun. 23, 2011

(30) Foreign Application Priority Data

Dec. 18, 2009 (EP) .................................... 09180027

(51) Int. Cl.
*C09D 13/00* (2006.01)
*C23C 26/00* (2006.01)

(52) U.S. Cl.
USPC ............................................ 427/11; 523/164

(58) Field of Classification Search
USPC ............................................ 427/11; 523/164
See application file for complete search history.

(56) References Cited

U.S. PATENT DOCUMENTS

| | | | |
|---|---|---|---|
| 2,319,585 A | 5/1943 | Chesler | |
| 5,084,493 A | 1/1992 | Olson et al. | |
| 7,491,761 B2 * | 2/2009 | Chen et al. | 524/186 |
| 2006/0062906 A1 | 3/2006 | Fukuo et al. | |
| 2011/0133134 A1 * | 6/2011 | Varma et al. | 252/511 |

FOREIGN PATENT DOCUMENTS

| | | | | |
|---|---|---|---|---|
| EP | 0435386 A1 | 7/1991 | | |
| JP | 9-255900 | * | 9/1997 | ................ C09C 1/48 |

* cited by examiner

*Primary Examiner* — Robert D. Harlan
(74) *Attorney, Agent, or Firm* — Laurence A. Greenberg; Werner H. Stemer; Ralph E. Locher

(57) ABSTRACT

A lead for painting includes a water-insoluble lead basic mass in which a water-soluble dye is present. A method of painting with a lead is also provided.

20 Claims, No Drawings

LEAD FOR PAINTING AND METHOD OF PAINTING WITH A LEAD

CROSS-REFERENCE TO RELATED APPLICATION

This application claims the priority, under 35 U.S.C. §119, of European Patent Application EP 09 180 027.6, filed Dec. 18, 2009; the prior application is herewith incorporated by reference in its entirety.

BACKGROUND OF THE INVENTION

Field of the Invention

The invention relates to a lead for painting, which is to be understood as meaning the lead of a pencil, for example of a wooden pencil, and a chalk, which is used for example with a paper or film covering. A pencil equipped with such a lead for painting or a painting chalk serve to produce predominantly flat marks on a substrate such as paper. No special surprise effect appealing predominantly to children is associated therewith. Of somewhat more interest in use are aquarelle leads. Those are formed of a water-soluble lead mass, meaning that a color application produced therewith can be subsequently partially dissolved through treatment with water and be distributed on the substrate using a brush. In that case, however, the original color of the lead is substantially retained. Furthermore, leads are known which are formed of differently colored strands. It is possible to produce multicolored marks, in which case different amounts of the individual colored strands are transferred to the substrate depending on the tilting position and rotational position of the lead, meaning that color nuances or color mixtures can be produced. The invention also relates to a method for painting with a lead.

SUMMARY OF THE INVENTION

It is accordingly an object of the invention to provide an alternative lead for painting and a method of painting with a lead, which overcome the hereinafore-mentioned disadvantages of the heretofore-known products and methods of this general type and with which surprising color effects can be produced.

With the foregoing and other objects in view there is provided, in accordance with the invention, a lead for painting. The lead comprises a water-insoluble lead basic mass containing a thermoplastic binder, a water-insoluble colored pigment and a water-soluble dye.

With the objects of the invention in view, there is also provided a method of painting with a lead. The method comprises painting an area of a painting substrate with the lead according to the invention, and then bringing the area of the painting substrate into contact with water using an application device to dissolve one dye present in the lead out of the lead mass and distribute the dye on the painted area.

A lead for painting according to the invention has a water-insoluble lead basic mass in which a water-soluble dye, in particular in solid form, for example as a powder, and a water-insoluble colored pigment, are present. Such a lead for painting permits a completely new painting method with a surprising color effect. Due to the water-insoluble lead basic mass colored with the water-insoluble colored pigment, a mark adhering to the painting substrate is produced when using the lead for painting. The lead basic mass is the mass of a lead which gives it the particular shape, consistency, mechanical and substantially also chemical properties, which form the majority of the lead. A lead basic mass of the present type is thus formed from a water-insoluble binder and just the same admixtures or lead constituents, such as for example inorganic or organic filler particles, lubricants, e.g. based on fatty acid, and other wax-like or fat-like additives. The dyes or dye particles present in the water-insoluble lead basic mass can, due to their solubility in water, be dissolved out of the lead mass e.g. using a brush or a sponge, and be distributed to a greater or lesser extent on the color application, in which case its color impression can be changed overall or restricted to individual area regions. It was unforeseeable that the dyes could be dissolved out of the lead mass although they are embedded in the water-insoluble matrix of the lead basic mass. Upon producing a lead mark on a substrate, the dye particles are presumably partially released so that they can come into contact with the water. The dissolution of the dye is also aided by the fillers present in the lead, which to a certain extent give it a porous consistency that makes it easier for the water to reach the dyes.

With the help of an application device having, for example, a brush or a sponge, it is thus possible to produce regions on the area colored with lead mass which have a coloration that differs from the color of the lead mass and which was previously not visible. These regions do not have to be dried in an involved or time-consuming manner. Instead, the water is absorbed by the painting substrate—generally absorbent substrates such as paper are used—whereupon the dye now colors the substrate. In this way, it is possible to produce diverse long-lasting color effects arising from the color difference between the mark and the substrate colored with the water-soluble dye. The absorption of the aqueous dye solution by the painting substrate is possible because the marks produced with a lead for painting of the present type do not completely cover the painting substrate. Rather, gaps are formed in a lead mark, including those which are not visible to the naked eye, through which the water can reach the painting substrate. In this connection, the fillers present in the lead mass also bring about a certain porosity and thus water permeability.

In principle, the water-insoluble lead mass can be formed of any desired substances provided a lead for painting that can be applied to a painting substrate can be produced therewith. A lead for painting is formed quite generally of a binder which embeds the admixtures present in the lead, such as fillers, the mentioned colored pigments and additives, in a binder matrix. Preference is given to using binders which can be processed without the addition of water together with the other lead constituents e.g. with high-speed mixers or kneaders, to give a mass which can be shaped, for example, in the course of extrusion to give lead strands. The water-soluble dye can then be added without problems to the starting mixture of the lead constituents without the risk of it dissolving and coloring the lead mass. A subsequent treatment with water, or aquarelling, would then barely still bring about the desired color-change effect. Suitable binders are also waxes and fatty acid derivatives and fats, which can likewise be mixed with the other lead constituents without adding water. Finally, in particular, thermoplastic polymers such as polystyrene, styrene-acrylonitrile, polypropylene, acrylic-butadiene-styrene, styrene-acrylonitrile etc. are also suitable. Binders of this type are mixed with the further lead constituents, such as fillers, lubricants and colorants at temperatures at which the binder softens and/or melts. A particularly preferred binder is polyvinylbutyral (PVB). Besides its environmental compatibility and toxicological acceptability, this polymer has the advantage that it already starts to melt at temperatures around 120° C. whereas the aforementioned polymers soften and can be extruded only at temperatures above 180° C. Thermally sensitive constituents, primarily thermally sensitive dyes, can barely still be processed without suffering damage. A lead mass including PVB as a binder, on the other hand, can already be extruded to leads at temperatures around 120° C., a temperature which most water-soluble dyes withstand. Furthermore, it is advantageous that, compared to other thermoplastic polymers, PVB has a greater binding capacity and therefore less PVB is required in order to bind a certain amount of e.g. particulate lead constituents or to produce a lead with a certain diameter. Consequently, using PVB as a binder, it is possible to produce leads with a high fraction of dyes and colored pigments, i.e. with high color intensity and high mechanical stability. Finally, for leads containing PVB as a binder, it is advantageous that they can be applied to a painting substrate in a pleasantly light manner, i.e. with low energy input, to form uniform marks.

Below a fraction of 1% (percentages used at this point and at other points are percentages by weight), it is barely still possible to produce leads with adequate strength and satisfactory marking behavior. At a binder fraction of more than 60% binder, the leads generally exhibit an excessively hard marking behavior. Due to the high binder fraction, the rest remaining for a dye (there are after all other constituents which are also still present, primarily fillers in relatively large amounts) is too low for a significant color effect to be achievable therewith upon treating a color application with water. Consequently, for the leads, a binder range of from 1% to 60% is observed. In the case of PVB which, as stated, need to be present in a considerably lower amount than other thermoplastic binders, that which is stated above applies accordingly with regard to the 1% lower limit. In the case of PVB, its fraction in the lead mass can be lower, meaning that it is preferably limited to 40%.

In order to further optimize the lead consistency and the marking behavior, at least one lubricant in the form of a fatty acid salt, in particular a stearic acid salt, and also further constituents such as waxes and oils, are present in the lead. Preferably, 0.1% to 20% lubricants and 5% to 35% waxes and/or oils are present.

Some water-soluble dyes require a certain pH range. In such cases, according to a further preferred embodiment, the lead includes a pH regulator, which is understood as meaning an acid, a base or an amphoteric agent. Upon treating a lead mark with water, the pH regulator is dissolved out of the lead basic mass together with the dye and changes the pH of the water. By way of example, mention can be made in this case of the dye CI 59040 (solvent green 7), which requires a basic medium. In order to increase the pH, an alkalizing agent is preferably added which exhibits no gas evolution at elevated temperatures, which is the case with sodium phosphate. A carbonate would likewise be suitable as an alkalizing agent, but would cleave off carbon dioxide at the elevated temperatures in the range from 120° C. to at least 200° C., at which a lead mass of the present type is extruded to strands, which would render the leads unusable due to gas inclusions.

Furthermore, there are dyes having a color which is only completely developed as a result of interaction with a substance present in the aqueous medium. This is the case with the aforementioned solvent green 7. Its fluorescent yellow color is only produced more intensely in the presence of a sugar, for example sucrose.

In order to produce the embodiments described below, the lead constituents are mixed intimately in high-speed mixers, twin-screw extruders or the like, which takes place at temperatures at which the thermoplastic binders being used soften and/or melt in such a way that they can be mixed intimately with the other lead constituents. Depending on the binder being used, higher or lower temperatures are required both for the mixing operation and also for the extrusion of lead strands. In the case of polymers such as polystyrene, acrylic-butadiene-styrene, polypropylene, styrene-acrylonitrile and the like, relatively high processing temperatures of more than 200° C. in most cases are required. In the case of the formulations using PVB as a binder, on the other hand, the processing temperatures are much lower, namely in a range around 120° C., which is advantageous in the case of thermally sensitive constituents. After the mixing, either granules are obtained, which are then extruded to give leads, or the lead mass is thoroughly mixed and immediately extruded to give lead strands without the intermediate step of producing granules. Following extrusion, the lead strands are cut to length and encased with a covering e.g. made of wood or—in the case of chalks—provided with a film-like covering.

If a mark on a painting substrate produced with a lead of the present type is treated with water, for example as is the case when aquarelling a mark produced with water-soluble colored leads, the water-soluble dyes are dissolved out. A picture produced on a painting substrate being formed e.g. of paper then has structures given by the lead marks with the base color of the lead mass, where the painting substrate, which has absorbed the colored solution formed by the aquarelling, is differently colored. This gives rise to a variety of configuration possibilities e.g. also as a result of the fact that for one picture, a plurality of colored leads with different colors of the lead basic mass and different water-soluble dyes are used.

Other features which are considered as characteristic for the invention are set forth in the appended claims.

Although the invention is illustrated and described herein as embodied in a lead for painting and a method for painting with lead, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples.

DETAILED DESCRIPTION OF THE INVENTION

Example 1

Lead with gray base color and luminous yellow water-soluble dye, diameter 4.0 mm:

| | |
|---|---|
| Polyvinylbutyral: | 2% |
| Graphite | 35% |
| Kaolin | 44% |
| Calcium stearate | 5% |
| Stearic acid | 5% |
| Sodium phosphate ($Na_3PO_4$) | 1% |
| Sucrose | 5% |
| CI 59040 | 3% |

The gray basic mass of the lead is achieved by adding graphite powder. The dye CI 59040 being used is dissolved upon treatment of a lead mark with water and/or upon aquarelling. In this case, the sodium phosphate and sucrose are also dissolved out of the mark, as a result of which the dye only then completely develops its luminous yellow color.

Example 2

Lead with gray base color and with two water-soluble dyes, diameter 3.3 mm:

| | |
|---|---|
| Polyvinylbutyral: CAS 68648-78-2 | 7.5% |
| Calcium stearate | 12.0% |
| N,N'-Ethylenebisstearamide CAS 110-30-5 | 6.0% |
| Neutral carbon wax | 1.8% |
| Kaolin | 30.9% |
| Castor oil | 1.8% |
| Graphite | 30.0% |
| Dye CI 42090 (blue) | 2.0% |
| Dye CI 19140 (yellow) | 8.0% |

In the case of this lead too, a gray lead base color is achieved by adding graphite. The dyes dissolved out of a lead mark as a result of aquarelling produce the mixed color green.

Example 3

Lead with a blue-violet base color and with a red, water-soluble dye, diameter 4.0 mm:

| | |
|---|---|
| Binder styrene-acrylonitrile (SAN) | 15% |
| Wax (e.g. carnauba wax) | 10% |
| Palm oil | 2% |
| Water-insoluble pigment CI 74160 (blue-violet) | 6% |
| Water-soluble dye CI 45410 (red) | 20% |
| Filler talc | 47% |

The pigment CI 74160 coloring the lead mass blue-violet—a phthalocyanine pigment—is water-insoluble, thus does not dissolve out of the lead basic mass upon aquarelling. As a result of the aquarelling of a lead mark, only the red dye dissolves.

Example 4

Lead with orange-brown base color and with blue, water-soluble dye. Diameter of the lead 3.0 mm:

| | |
|---|---|
| Binder polyvinylbutyral CAS 68648-78-2 | 10.0% |
| Zinc stearate | 10.0% |
| Paraffin wax | 8.0% |
| Kaolin | 58.0% |
| Pigment CI 71105 | 10.0% |
| Blue dye CI 42090 | 4.0% |

The orange-brown base color of the lead mass is achieved by the water-insoluble pigment CI 71105.

Example 5

Lead with orange-brown base color and with blue, water-soluble dye. Diameter of the lead 2.5 mm:

| | |
|---|---|
| Binder polyvinylbutyral CAS 68648-78-2 | 36.0% |
| Zinc stearate | 12.0% |
| Paraffin wax | 8.0% |
| Kaolin | 28.0% |
| Pigment CI 71105 | 12.0% |
| Blue dye CI 42090 | 4.0% |

The lead corresponds to Example 4 with regard to the colorant being used, but differs from it primarily as a result of a higher content of PVB and a lesser amount of filler.

Example 6

Chalk with orange-brown base color and with blue, water-soluble dye. Diameter of the chalk 8.0 mm:

| | |
|---|---|
| Binder polyvinylbutyral CAS 68648-78-2 | 7.0% |
| Zinc stearate | 10.0% |
| Paraffin wax | 9.0% |
| Kaolin | 60.0% |
| Pigment CI 71105 | 10.0% |
| Blue dye CI 42090 | 4.0% |

This is a lead or a chalk with a composition which corresponds substantially to that of Example 4, although the content of PVB is lower.

Example 7

Lead with gray base color and luminous blue water-soluble dye, diameter 4.0 mm:

| | |
|---|---|
| Polystyrene (Standard PS): | 46% |
| Graphite | 35% |
| Calcium stearate | 5% |
| Stearic acid | 5% |
| Blue dye CI 42090 | 9% |

The gray base color of the lead is achieved by adding graphite. The dye CI 42090 being used is dissolved upon treating a lead mark with water or upon aquarelling.

The invention claimed is:

1. A lead for painting, the lead comprising:
   a water-insoluble lead basic mass containing a thermoplastic binder, a water-insoluble colored pigment and a water-soluble dye disposed in a lead for painting.

2. The lead for painting according to claim 1, wherein said binder is present in a fraction of 1% to 60%.

3. The lead for painting according to claim 2, wherein said binder is polyvinylbutyral.

4. The lead for painting according to claim 3, wherein said polyvinylbutyral is present in a fraction of 1% to 40%.

5. The lead for painting according to claim 1, which further comprises a lubricant.

6. The lead for painting according to claim 5, wherein said lubricant is a fatty acid salt.

7. The lead for painting according to claim 6, wherein said fatty acid salt includes a stearic acid salt.

8. The lead for painting according to claim 5, wherein said lubricant is present in a fraction of 0.1% to 20%.

9. The lead for painting according to claim 1, which further comprises a wax.

10. The lead for painting according to claim 1, which further comprises an oil.

11. The lead for painting according to claim 10, wherein said oil is castor oil.

12. The lead according to claim 9, which further comprises an oil, at least one of said wax or said oil being present in a content of 5% to 35%.

13. The lead according to claim 1, which further comprises a water-soluble pH regulator.

14. The lead according to claim 1, which further comprises a water-soluble agent intensifying a color of a colorant.

15. A method of painting with a lead, the method comprising the following steps:
    painting an area of a painting substrate with the lead according to claim 1; and
    then bringing the area of the painting substrate into contact with water using an application device to dissolve a dye present in the lead out of the lead mass and distribute the dye on the painted area.

16. The method according to claim 15, which further comprises using a brush or a sponge as the application device.

17. The method according to claim 15, wherein the painting substrate is made of paper.

18. The method according to claim 16, wherein the painting substrate is made of paper.

19. A painting instrument, comprising:
    a lead for painting including a water-insoluble lead basic mass containing a thermoplastic binder, a water-insoluble colored pigment and a water-soluble dye disposed in said lead for painting; and
    a wood, paper or film covering surrounding said lead for painting.

20. A method of painting with a painting instrument, the method comprising the following steps:
    painting an area of a painting substrate with the painting instrument according to claim 19; and
    then bringing the area of the painting substrate into contact with water using an application device to dissolve a dye present in the lead out of the lead mass and distribute the dye on the painted area.

* * * * *